W. CLARY.
DIRIGIBLE HEADLIGHT FOR AUTOMOBILES.
APPLICATION FILED NOV. 29, 1916.

1,233,027.

Patented July 10, 1917.
2 SHEETS—SHEET 1.

Inventor
W. Clary

Witnesses

W. CLARY.
DIRIGIBLE HEADLIGHT FOR AUTOMOBILES.
APPLICATION FILED NOV. 29, 1916.

1,233,027.

Patented July 10, 1917.
2 SHEETS—SHEET 2.

Inventor
W. Clary

UNITED STATES PATENT OFFICE.

WILLIAM CLARY, OF GOLDENDALE, WASHINGTON.

DIRIGIBLE HEADLIGHT FOR AUTOMOBILES.

1,233,027.  Specification of Letters Patent.  Patented July 10, 1917.

Application filed November 29, 1916. Serial No. 134,112.

*To all whom it may concern:*

Be it known that I, WILLIAM CLARY, a citizen of the United States, residing at Goldendale, in the county of Klickitat, State of Washington, have invented a new and useful Dirigible Headlight for Automobiles; and I do hereby declare the following to be a full, clear, and exact description of the invention, such as will enable others skilled in the art to which it appertains to make and use the same.

This invention relates to an improved dirigible headlight mechanism for automobiles, and an object of the invention is to provide an improved device of this kind, comprising simple, efficient and practical features of construction whereby as the front wheels are guided in one direction or the other, the headlights will correspondingly turn.

One of the features of construction is to provide a connecting bar between the knuckle hub joints of the front wheels, there being a sleeve on said bar through which a rod extends, which rod is so yieldably mounted in said sleeve as to compensate for the movement of the connecting bar forwardly and rearwardly, as the wheels are turned in one direction or the other.

Another feature of construction is to provide a yieldable telescopic joint between an upright portion of said rod, and a connecting bar of the headlights, whereby as the front wheels turn to the right or left, the headlights are correspondingly turned.

In practical fields, the details of construction may necessitate alterations falling within the scope of what is claimed.

The invention comprises further features and combination of parts, as hereinafter set forth, shown in the drawings, and claimed.

In the drawings:—

Figure 1 is a view in front elevation of an automobile, showing the improved dirigible headlight mechanism applied thereto.

Fig. 5 is a detail sectional view of the yieldable telescopic joint between the connecting bar of the headlights, and an upright portion of said forwardly extending rod.

Figure 2:
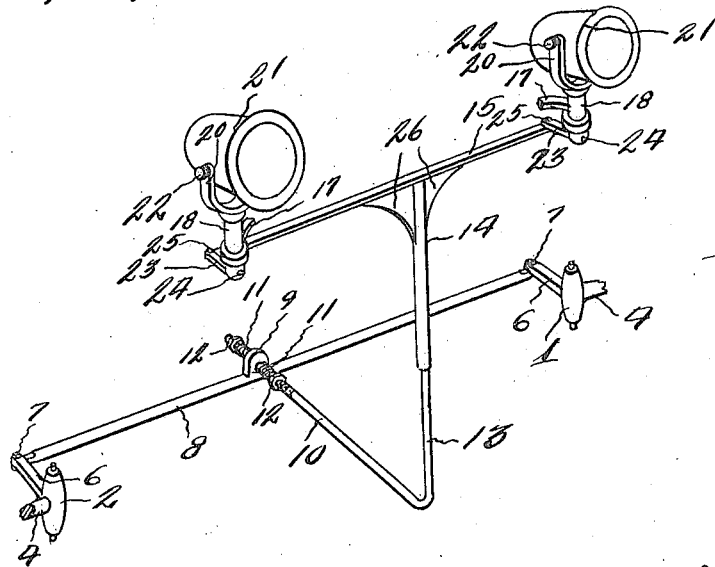
Fig. 2 is a detail perspective view of the headlight mechanism detached.
Figure 3:
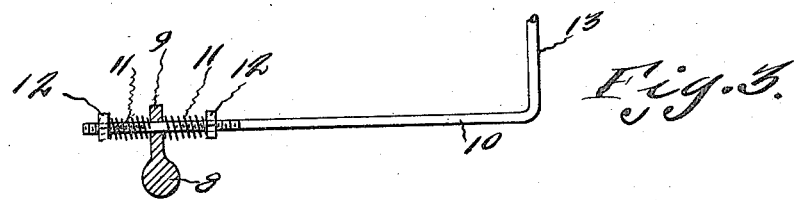
Fig. 3 is a detail sectional view of a portion of the connecting bar between the knuckle joints of the front wheel, and showing the rod yieldably mounted in the transverse sleeve of said connecting bar.
Figure 4:
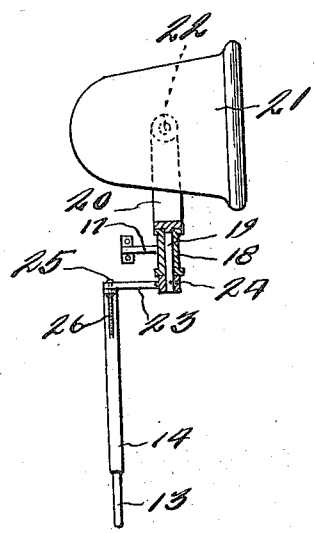
Fig. 4 is a view partly in elevation and partly in section, showing the mounting for one of the headlights.

Referring more especially to the drawings, 1 and 2 designate the knuckle hubs of the front axle 3 of the automobile, and on the stub axles 4 of said knuckle hubs the front wheels 5 are mounted. The knuckle hubs are provided with rearwardly extending arms 6, which in turn are pivoted at 7 to the ends of a connecting bar 8. This connecting bar 8 substantially at its center portion is provided with an integral apertured lug 9. Mounted in the lug is a rod 10, and mounted on the rod are springs 11, one adjacent each end of the lug 9. The rod 10 has threaded thereon nuts 12, which may be adjusted toward each other, and toward the springs 11, in order to compress them. By this construction, there is a yielding action between the bar 8 and the rod 10, as the bar 8 moves forwardly and rearwardly responsive to the transverse movement of the bar 8, which transverse movement is caused by the wheels 5 turning toward the right or the left. The rod 10 at its forward portion is provided with an upstanding part 13, which telescopes the downward extending tubular arm 14 of the bar 15, which connect to the head lights. Mounted in the tubular arm 14 is a coil spring 16, which acts between the upper inner end of the tubular arm and the upper extremity of the part 13 of the rod 10, thereby allowing for the vertical vibration of the body of the automobile. Fixed to the hood of the automobile near the forward end thereof and upon opposite sides are brackets 17 having the cylindrical bearings 18, in which the downwardly extending cylindrical pintles 19 of the lamp brackets 20 are mounted, so that the brackets will turn horizontally to the right or the left. The usual construction of lamps 21 are pivoted at 22 in said brackets 20. Arms 23 are fixed by means of pins 24 on the lower ends of the pintles 19. The arms 23 extend rearwardly, and have their ends connected to the ends of the bar 15, by means of the pivot pins 25. It will be seen by the foregoing construction that when the front wheels turn to the right or the left, the bar 8 will move transversely, and carry with it the rod 10. The rod 10, will in turn, by virtue of the joint between the part 13 and the arm 14 move the bar 15 transversely, thereby causing the lamps to move correspondingly with the front wheels. The downwardly extending tubular arm 14 is braced relative to the bar 15, by means of the webs 26.

The invention having been set forth, what is claimed as new and useful, is:—

1. In combination with the knuckle hubs of the front wheels of an automobile provided with rearwardly extending arms, a connecting bar connecting the rear ends of said arms and provided with a centrally disposed integral apertured lug, a forwardly extending rod yieldably mounted in said lug and provided with an upstanding part at its forward end, lamp brackets mounted in bearings of the hood of the automobile and provided with rearwardly extending arms, a bar connecting the rearwardly extending arms of the lamp brackets and provided with a downwardly extending tubular arm having a yieldable telescopic joint with the upstanding part of said forward rod, whereby as the front wheels turn to the right or the left, the lamps will correspondingly turn.

2. In combination with the knuckle hubs of the front wheels of an automobile provided with rearwardly extending arms, a connecting bar connecting the rear ends of said arms, a forwardly extending rod disposed transversely of said bar and having yieldable connections therewith, said rod having at its forward end an upwardly extending part, lamp brackets mounted in bearings of the hood of the automobile and provided with rearwardly extending arms, a bar connecting the arms of the lamp bracket and having a telescopic yieldable connection with the upwardly extending part of said rod, whereby as the wheels turn to the right or the left, the lamps correspondingly turn.

In testimony whereof I have signed my name to this specification in the presence of two subscribing witnesses.

WILLIAM CLARY.

Witnesses:
AZALEA BYARS,
E. H. LEE.

Copies of this patent may be obtained for five cents each, by addressing the "Commissioner of Patents, Washington, D. C."